United States Patent
Hu et al.

(10) Patent No.: US 11,726,671 B2
(45) Date of Patent: Aug. 15, 2023

(54) MEMORY ACCESS MODE SELECTION

(71) Applicant: Micron Technology, Inc., Boise, ID (US)

(72) Inventors: Guang Hu, Mountain View, CA (US); Jianmin Huang, San Carlos, CA (US); Zhengang Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 76 days.

(21) Appl. No.: 17/357,436

(22) Filed: Jun. 24, 2021

(65) Prior Publication Data
US 2022/0413714 A1 Dec. 29, 2022

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885;

(Continued)

(56) References Cited

U.S. PATENT DOCUMENTS 7,024,571 B1 * 4/2006 Reger ................... G06F 9/4406
  713/323
7,460,383 B2 * 12/2008 Fukuda ................ G06F 3/0655
  365/49.1

(Continued)

FOREIGN PATENT DOCUMENTS

WO 2017074570 A1 5/2017

OTHER PUBLICATIONS

Tomoya Suzuki et al.; Approaching DRAM performance by using microsecond-latency flash memory for small-sized random read accesses: a new access method and its graph applications; Proc. VLDB Endow. 14, 8 (Apr. 2021) (Year: 2021).*

(Continued)

*Primary Examiner* — Daniel C. Chappell
(74) *Attorney, Agent, or Firm* — Brooks, Cameron & Huebsch, PLLC

(57) ABSTRACT

A method includes determining one or more quality attributes for memory cells of a memory device, receiving a memory access request involving data written to at least a portion of the memory cells, and determining whether the memory access request corresponds to a random read operation or a sequential read operation. The method further includes responsive to determining that the memory access request corresponds to a random read operation or responsive to determining that the one or more quality attributes for memory cells are greater than a threshold quality level, or both, selecting a read mode for use in performance of the random read operation and performing the random read operation using the selected read mode.

20 Claims, 5 Drawing Sheets

(58) Field of Classification Search
CPC .......... G06F 2206/00–20; G06F 2209/00–549;
G06F 2211/00–902; G06F 2212/00–7211;
G06F 2213/00–4004; G06F 2216/00–17;
G06F 2221/00–2153; G06K 9/00–6298;
G06N 3/00–126; G06N 5/00–048; G06N
7/00–08; G06N 10/00; G06N 20/00–20;
G06N 99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
27/00–3293; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | | |
|---|---|---|---|---|
| 7,990,648 | B1* | 8/2011 | Wang | G11B 20/10361 |
| | | | | 360/65 |
| 9,583,160 | B1* | 2/2017 | Pekny | G11C 16/08 |
| 9,606,731 | B2* | 3/2017 | Jun | G11C 7/10 |
| 10,078,456 | B2* | 9/2018 | Ly | G06F 13/1615 |
| 10,509,597 | B2* | 12/2019 | Gaewsky | G06F 3/0659 |
| 11,216,381 | B2* | 1/2022 | Ke | G06F 12/0882 |
| 11,372,753 | B2* | 6/2022 | Asano | G06F 3/0688 |
| 11,526,302 | B2* | 12/2022 | Smolka | G06F 13/124 |
| 2001/0024131 | A1* | 9/2001 | Solimene | G11C 16/08 |
| | | | | 327/20 |
| 2009/0140231 | A1* | 6/2009 | Yukawa | H01L 27/13 |
| | | | | 257/4 |
| 2013/0185464 | A1* | 7/2013 | Bessho | G06F 3/061 |
| | | | | 710/18 |
| 2014/0231954 | A1 | 8/2014 | Lue | |
| 2015/0016191 | A1* | 1/2015 | Tsai | G11C 29/12015 |
| | | | | 365/185.18 |
| 2016/0179386 | A1 | 6/2016 | Zhang | |
| 2020/0019459 | A1* | 1/2020 | Cadloni | G06F 3/0619 |
| 2020/0019460 | A1* | 1/2020 | Cadloni | G11C 29/021 |
| 2020/0034223 | A1* | 1/2020 | Rori | G06F 11/073 |
| 2021/0279138 | A1* | 9/2021 | Lee | G06F 12/0246 |

OTHER PUBLICATIONS

S. Choudhuri and T. Givargis, "Performance improvement of block based NAND flash translation layer," 2007 5th IEEE/ACM/IFIP International Conference on Hardware/Software Codesign and System Synthesis (CODES+ISSS), 2007, pp. 257-262, doi: 10.1145/1289816.1289878. (Year: 2007).*

Specs for first Intel 3D XPoint SSD: so-so transfer speed, awesome random I/O; Ars Staff; Feb. 10, 2017; retrieved from https://arstechnica.com/information-technology/2017/02/specs-for-first-intel-3d-xpoint-ssd-so-so-transfer-speed-awesome-random-io/ on Nov. 3, 2022 (Year: 2017).*

S. Guo, Z. Liu, G. Li and D. Wang, "Content-aware write reduction mechanism of phase-change RAM based Frame Store in H.264 Video codec system," 2013 IEEE International Symposium on Circuits and Systems (ISCAS), Beijing, China, 2013, pp. 273-276, doi: 10.1109/ISCAS.2013.6571835. (Year: 2013).*

T. Akutsu, M. Natsui and T. Hanyu, "Write-Operation Frequency Reduction for Nonvoratile Logic LSI with a Short Break-Even Time," 2015 IEEE International Symposium on Multiple-Valued Logic, Waterloo, ON, Canada, 2015, pp. 152-157, doi: 10.1109/ISMVL.2015.18. (Year: 2015).*

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

MEMORY ACCESS MODE SELECTION

TECHNICAL FIELD

Embodiments of the disclosure relate generally to memory sub-systems, and more specifically, relate to memory access mode selection.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
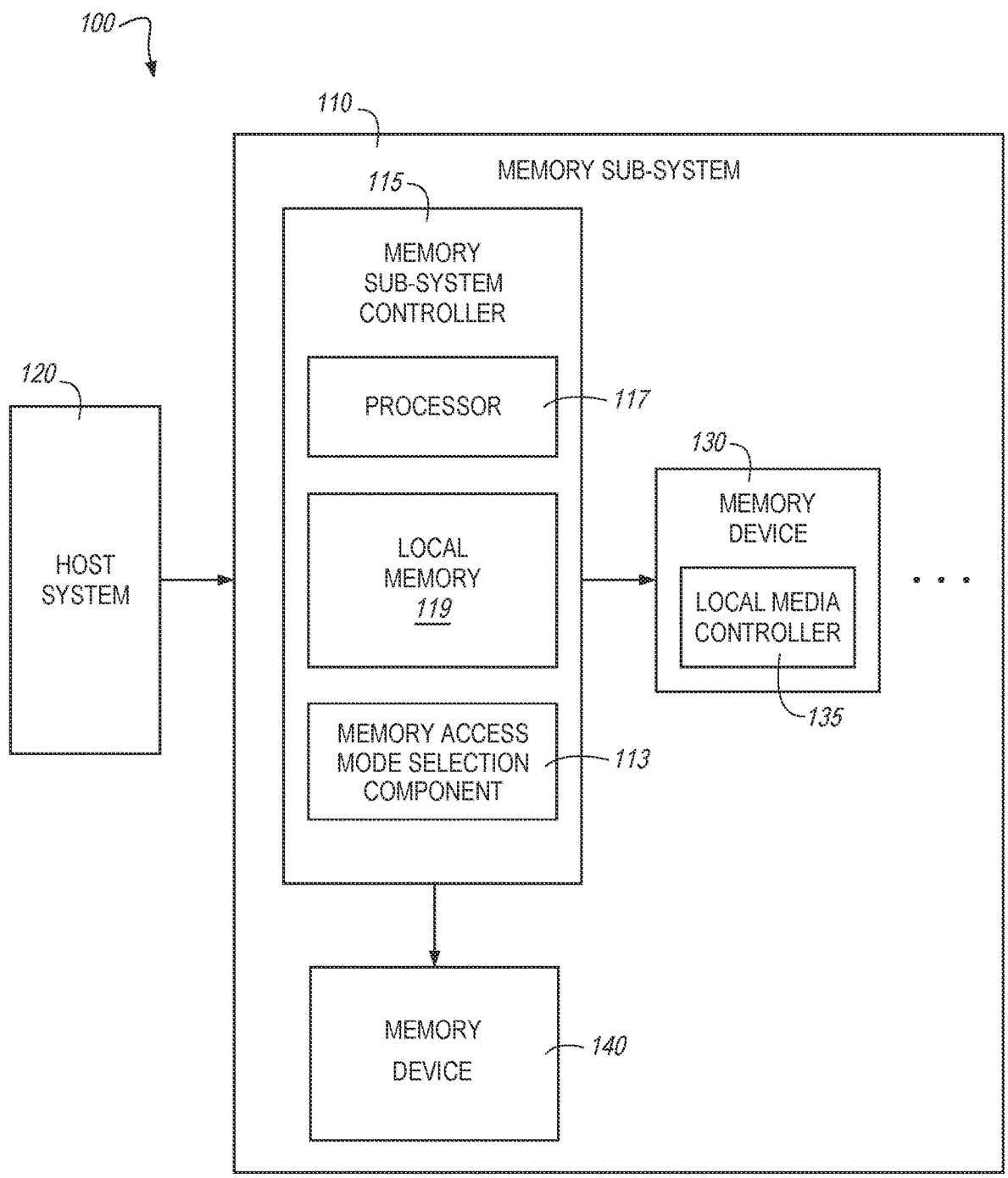
FIG. 1 illustrates an example computing system that includes a memory sub-system in accordance with some embodiments of the present disclosure.

Aspects of the present disclosure are directed to memory access mode selection in a memory sub-system, in particular to memory sub-systems that include a memory access mode selection component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation, a memory sub-system can receive various memory access requests (e.g., requests to read or write data to a memory device of the memory sub-system). Performance of an operation to retrieve data indicated by the memory access request is generally subject to some amount of latency. That is, there is an amount of time that transpires between execution of the memory access request and the data either being read from or written to the memory device. In some memory sub-systems, the read operation time ("tR") is the dominating component of the latency associated with performing a memory access.

In general, a memory access request can correspond to memory accesses that involve data that is either written to sequential memory cells of the memory device (e.g., sequential data) or data that is written to memory cells that are scattered throughout the memory device (e.g., random data). Due to bring scattered throughout the memory device, memory accesses that involve random data generally experience a lower throughput and higher latency than memory accesses that involve sequential data.

As memory device technology evolves, increasingly demanding workloads and higher performance expectations are placed on memory devices. Accordingly, it has become desirable to maximize throughput while mitigating latencies associated with performing a memory access operation (e.g., fulfilling a memory access request) to improve the performance of the memory device. For example, it is desirable to improve read performance, particularly random read performance (e.g., an amount of time associated with fulfilling a memory access request that involves random data), by attempting to lessen the latency associated with fulfilling a memory access request that involves random data. This can, in turn, improve the overall performance of the memory device and therefore improve the overall performance of a computing system in which the memory device is operating.

In addition, it can be beneficial to reduce the tR of a memory device in scenarios in which the queue depth of the memory device is relatively low. For example, when the queue depth is relatively low for a memory device, the tR of the memory device can become a bottleneck, especially in low density memory devices, such as memory devices associated with mobile computing devices. As will be appreciated, the queue depth of the memory device generally refers to a quantity of simultaneously pending memory access requests that are waiting to be processed.

However, reduction of the tR of a memory device can be difficult to achieve. One reason for this is that the memory sub-system generally has a maximum allowed raw bit error rate (RBER) in order to provide standardized data quality. As will be appreciated, the RBER of a memory sub-system, memory device, memory array, etc. is generally quantified as the number of corrupted bits (e.g., bits in error) per number of total bits read (including correctable as well as uncorrectable errors). Multiple factors, such as temperature, wear-out from program erase cycles (PEC); physical age, (e.g., the number of months a device has been in the field, independent of PEC); workload, which can be measured by a quantity of read, write, and/or erase operations, because such operations to, for example, a page, can potentially disturb surrounding cells; and the presence of other errors in the memory sub-system can affect the RBER of a memory sub-system. In some embodiments, the RBER can be determined after successful decoding of data stored by a memory sub-system.

Aspects of the present disclosure address the above and other deficiencies by allowing for the RBER requirements for the memory sub-system to be relaxed during performance of certain memory access operations under certain conditions. This can allow for a reduction in latency (e.g., tR) associated with performance of certain memory access operations, which can lead to increased throughput of the memory sub-system and, in turn, improved performance of the memory sub-system. In some embodiments, the RBER requirements for the memory sub-system can be relaxed during performance of certain memory access operations based on quality attributes of memory cells involved in the memory access, a unit size of the data to be accessed (e.g., how much data is involved in the memory access) by the memory access, and/or based on an age of the memory sub-system and/or memory device (e.g., how close the memory sub-system or memory device is a beginning-of-life (BOL) or end-of-life (EOL). Non-limiting examples of the quality attributes of the memory cells can include a quantity of program-erase cycles (PECs) the memory cells have experienced and/or a quantity of bits that can be stored by the memory cells (e.g., if the memory cells are SLC, MLC, TLC, or QLCs), among others.

In addition, aspects of the present disclosure address the above and other deficiencies by allowing for different memory access modes to be selected based on quality attributes of the memory cells involved in the memory access, a quantity of data to be accessed by the memory access, and/or the age of the memory sub-system and/or memory device, among others. As described in more detail, herein, the different memory access modes can correspond to different read modes for the memory for the memory sub-system. In some embodiments, the different memory access modes can have different commands, trim sets, latencies (e.g., tR values), and/or allowed RBER requirements associated therewith. By performing the operations described herein, memory sub-system performance can be improved in comparison to approaches that do not allow for the RBER requirements to be relaxed under certain conditions and/or do not allow for one of multiple memory access modes to be selected based on quality attributes of the memory cells involved in the memory access, a quantity of data to be accessed by the memory access, and/or the age of the memory sub-system and/or memory device.

Table 1 illustrates several non-limiting examples of memory access modes. As shown in Table 1, each of the example memory access modes can have a different read operation time (e.g., tR) and a different allowed RBER requirement for the memory sub-system and/or memory device. Each of the memory access modes can have a corresponding set of memory access commands associated therewith and each of the memory access modes and/or corresponding memory access commands can have a particular trim set associated thererwith.

TABLE 1

| MEOMRY ACCESS MODE | READ OPERATION TIME (tR) | EXAMPLE ALLOWED RBER REQUIREMENT |
|---|---|---|
| First Memory Access Mode | ~25 us | $5 \times 10^{-3}$ |
| Second Memory Access Mode | ~30 μs | $4 \times 10^{-3}$ |
| Third Memory Access Mode | ~40 μs | $3 \times 10^{-3}$ |

The non-limiting example illustrated in Table 1 shows three distinct memory access modes: a first memory access mode, a second memory access mode, and a third memory access mode. The memory access modes shown in Table 1 each have an increasing tR and decreasing allowed RBER requirement. For example, the first memory access mode can perform a memory access operation faster than the second and third memory access modes; however, selection of the first memory access mode is predicated on a higher allowed RBER requirement than the second or third memory access modes.

As mentioned above, one of the memory access modes can be selected for performance of a memory access operation based on quality attributes of the memory cells involved in the memory access, a quantity of data to be accessed by the memory access, and/or the age of the memory sub-system and/or memory device, among others. For example, the first memory access mode can be selected for performance of a memory access operation when it is determined that memory cells involved in the memory access have high quality attributes (e.g., have experienced a relatively low quantity of PECs) and/or when the memory sub-system and/or memory device are close to a BOL condition. Conversely, the second memory access mode and/or third memory access mode can be selected for performance of a memory access operation when it is determined that memory cells involved in the memory access have low quality attributes (e.g., have experienced a relatively high quantity of PECs) and/or when the memory sub-system and/or memory device are close to an EOL condition.

In some embodiments, the first memory access mode can be selected when the average PEC count for memory cells of the memory sub-system and/or memory device is above 80% of a target endurance threshold. If the average PEC count for memory cells of the memory sub-system and/or memory device is below 80% of the target endurance threshold, the second memory access mode can be selected and used for performance of memory access operations. In addition to or in the alternative, the second memory access mode can be selected for performance of memory access operations if an error or failure is detected during performance of a memory access operation using the first memory access mode.

In some embodiments, the first memory access mode and/or the second memory access mode can be selected for performance of a memory access operation that involves random data, while the third memory access mode can be selected for performance of a memory access operation that involves sequential data. Embodiments are not so limited, however, and in some embodiments, the first memory access mode and/or the second memory access mode can be selected for performance of a memory access operation that involves a portion of a page of memory cells or a "set of memory cells" (e.g., less than a full page of memory cells), while the third memory access mode can be selected for performance of a memory access operation that involves a full page or cross-plane page of memory cells.

In yet other embodiments, the second memory access mode can be selected for performance of a memory access in response to a failure of a memory access operation using the first memory access mode. That is, in some embodiments, the second memory access mode can be selected for performance of a memory access responsive to a determination that data accessed using the first memory access mode did not accurately decode.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (loT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a memory access mode selection component 113. Although not shown in FIG. 1 so as to not obfuscate the drawings, the memory access mode selection component 113 can include various circuitry to facilitate performance of memory accesses using one of multiple memory access modes. As described in more detail, herein, the memory access modes can be selected based on quality attributes of memory cells involved in a memory access operation, an age of the memory sub-system 110, and/or a size of the data involved in the memory access operation. By utilizing a particular selectable memory access mode under different operational conditions of the memory sub-system, latency of a memory access can be reduced, thereby increasing throughput of the memory sub-system and improving the overall performance of the computing system 100. In some embodiments, the memory access mode selection component 113 can include special purpose circuitry in the form of an ASIC, FPGA, state machine, and/or other logic circuitry that can allow the memory access mode selection component 113 to orchestrate and/or perform operations described herein involving the memory device 130 and/or the memory device 140.

In some embodiments, the memory sub-system controller 115 includes at least a portion of the memory access mode selection component 113. For example, the memory sub-system controller 115 can include a processor 117 (processing device) configured to execute instructions stored in local memory 119 for performing the operations described herein. In some embodiments, the memory access mode selection component 113 is part of the host system 110, an application, or an operating system.

In a non-limiting example, an apparatus, (e.g., the computing system 100 and/or the memory sub-system 110) can include a memory device 130/140 and a memory access mode selection component 113. The memory access mode selection component 113 can determine one or more quality attributes for memory cells of the memory device 130/140. As described above, the quality attributes can include an operating temperature, memory cell wear-out from program erase cycles (PEC); physical age, (e.g., the number of months or years a device has been in the field, independent of PEC); workload, which can be measured by a quantity of read, write, and/or erase operations, disturb effects; and the presence of other errors in the memory sub-system 110. Accordingly, in some embodiments, the one or more quality attributes for the memory cells of the memory device can include a quantity of program-erase cycles associated with the memory cells, a life stage of the memory device, or determined workload characteristics of the memory device, or any combination thereof.

The memory access mode selection component 113 can be resident on the memory sub-system 110. As used herein, the term "resident on" refers to something that is physically located on a particular component. For example, the memory access mode selection component 113 being "resident on" the memory sub-system 110 refers to a condition in which the hardware circuitry that comprises the memory access mode selection component 113 is physically located on the memory sub-system 110. The term "resident on" can be used interchangeably with other terms such as "deployed on" or "located on," herein.

In some embodiments, the memory access mode selection component 113 can receive a memory access request (e.g., signaling indicative of performance of a memory access operation) involving the set of memory cells and determine, based at least in part on the received memory access request, whether performance of the memory access operation involves a random read operation or a sequential read operation. The memory access mode selection component 113 can determine, based at least in part on the one or more quality attributes for the set of memory cells being greater than a threshold quality level and whether performance of the memory access operation involves the random read operation or the sequential read operation, a particular memory access command to issue to retrieve data from at least a portion of the memory cells (e.g., a set of memory cells such as the sets of memory cells 235-1 to 235-N illustrated in FIG. 2, herein) and perform the memory access operation to retrieve the data from at least the portion of memory cells.

In some embodiments, the memory access mode selection component 113 can perform the memory access in around thirty (30) microseconds or less (e.g., 30 microseconds, 25 microseconds, etc.). That is, in contrast to conventional memory access operations that generally are performed in around forty (40) microseconds or more, the memory access mode selection component 113 can perform the memory access in around thirty (30) microseconds or less (e.g., 30 microseconds, 25 microseconds, etc.). Further, in some embodiments, the particular memory access command can correspond to a particular memory access mode, such as the first memory access mode or the second memory access mode described above in connection with Table 1.

Continuing with this example, when the one or more quality attributes for the memory cells is greater than the threshold quality level and when the memory access operation involves a random read operation, the portion of the memory cells can include fewer memory cells than a page size of the memory device 130/140. In such embodiments, the memory access mode selection component 113 can perform the memory access operation to retrieve the data from the portion of the memory cells. That is, based on the particular selected memory access command (e.g., the selected memory access mode), the memory access mode selection component 113 can retrieve data that has a size less than the page size of the memory device 130/140 (e.g., less than 16 kilobytes (KB)).

Embodiments are not so limited, and in some embodiments, when the one or more quality attributes for the set of memory cells is less than the threshold quality level or when the memory access operation involves the sequential read operation, or both, the portion of the memory cells can be a page size of the memory device 130/140. In such embodiments, the memory access mode selection component 113 can perform the memory access operation to retrieve the data from the portion of the memory cells.

Continuing with this example, the memory access mode selection component 113 can increase (e.g., relax) an allowed raw bit error rate (RBER) for the set of memory cells (as described above in connection with Table 1) based, at least in part, on the determined quality attributes for the memory cells being greater than the threshold quality level and/or determining that the signaling indicative of performance of the memory access operation corresponds to a random read operation.

In some embodiments, the particular memory access command can be selected from among at least three memory access commands each having a distinct trim set corresponding thereto and each of the at least three memory access commands has a different raw bit error rate (RBER) tolerance associate therewith. For example, one memory access commands can have a "normal" RBER tolerance (e.g., a RBER requirement associated with the memory sub-system 110 when operating in a standard operating mode), while the other memory access commands can have a RBER tolerance (e.g., system RBER requirement) that is relaxed such that a higher RBER is tolerated by the memory sub-system 110 at least during performance of one or more memory accesses.

Figure 2:
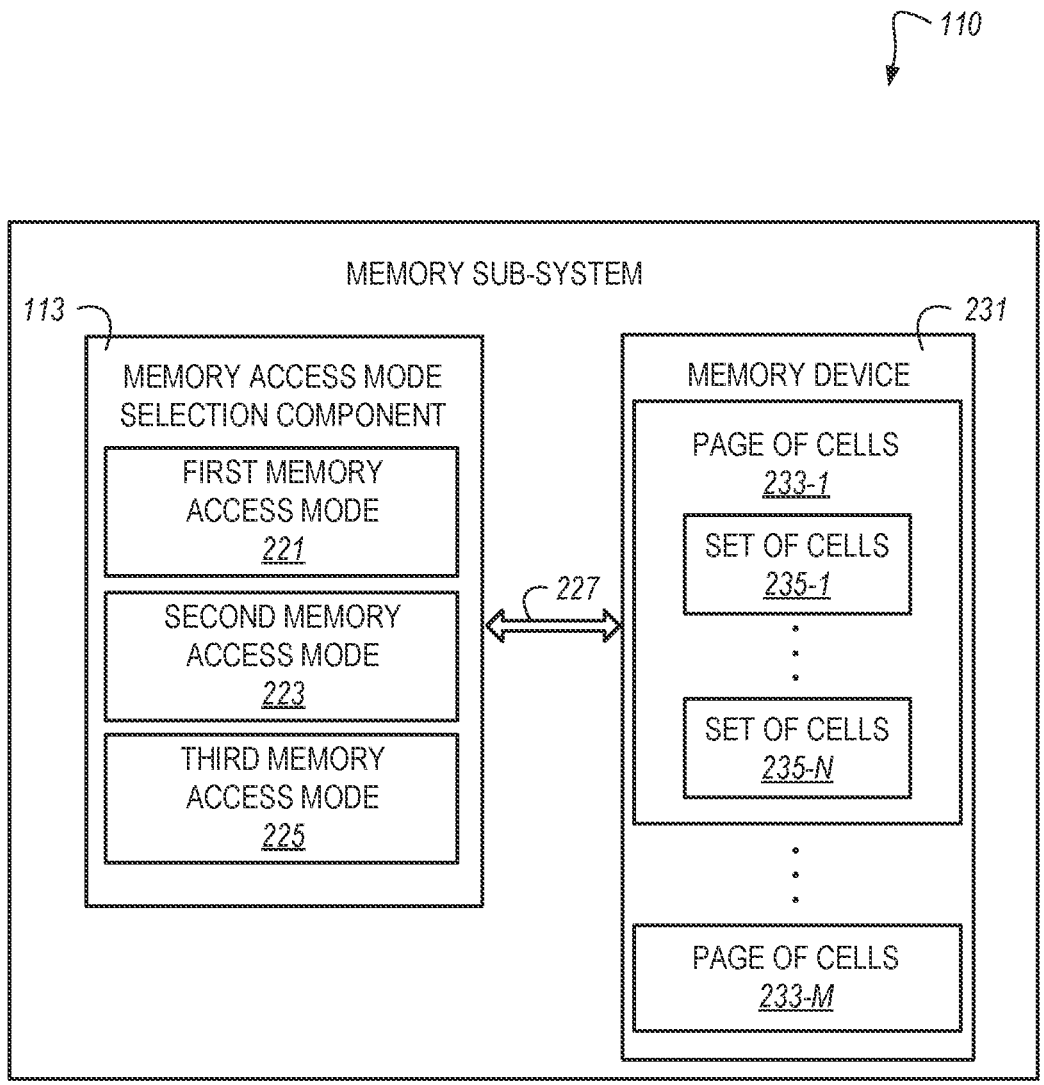
FIG. 2 illustrates an example memory sub-system in accordance with some embodiments of the present disclosure.

FIG. 2 illustrates an example memory sub-system 110 in accordance with some embodiments of the present disclosure. As shown in FIG. 2, the memory sub-system 110 can include a memory access mode selection component 113, which can be analogous to the memory access mode selection component 113 illustrated in FIG. 1 and a memory device 231, which can be analogous to the memory device 130 or the memory device 140 illustrated in FIG. 1. The memory device 231 can include pages of memory cells 233-1 to 233-M, which can be further divided into sets of memory cells 235-1 to 235-N. Although sets of memory cells 235-1 to 235-M are illustrated explicitly within the page of memory cells 233-1, it will be appreciated that the page of memory cells 233-M can similarly include sets of memory cells. The sets of memory cells 235-1 to 235-N can be NAND memory cells, although embodiments are not so limited. In some embodiments, the memory sub-system 110, and hence the processing device and the memory device 231, can be resident on a mobile computing device such as a smartphone, laptop, phablet, Internet-of-Things device, autonomous vehicle, or the like. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

Multiple memory access modes can be associated with the memory access mode selection component 113. That is, as shown in FIG. 2, the memory access mode selection component can store one or more instruction sets corresponding to each of a first memory access mode 221, a second memory access mode 223, and a third memory access mode 225. The first memory access mode 221, the second memory access mode 223, and the third memory access mode 225 can be analogous to the first memory access mode, the second memory access mode, and the third memory access mode described above in connection with Table 1. In addition, although shown as three distinct memory access modes, fewer than or greater than three memory access modes are contemplated within the scope of the disclosure.

In a non-limiting example, a memory device 231 can include multiple NAND memory cells (e.g., the sets of cells 235-1 to 235-N). A processing device (e.g., the memory access mode selection component 113) can be coupled to the memory device 231 via, for example, a communication path 227. The processing device can perform various operations, such as determining one or more quality attributes for a set of memory cells 235-1 to 235-N among the NAND memory cells. In some embodiments, the set of memory cells 235-1 to 235-N includes fewer memory cells than a page size (e.g., a quantity of memory cells within the each of the pages of cells 233-1 to 233-M) of the memory device 231. The processing device can perform operations including receiving signaling indicative of a memory access involving the set of memory cells 235-1 to 235-N. In some embodiments, the signaling can be received from circuitry external to the memory device 231, such as from other component of the memory sub-system 110 (which are described above in connection with FIG. 2) and/or from a host system, such as the host system 120 illustrated in FIG. 1, herein.

The processing device can perform operations including determining whether the signaling indicative of the memory access corresponds to a random read operation or a sequential read operation and, responsive to determining that the signaling indicative of the memory access corresponds to the random read operation and/or responsive to determining that the one or more quality attributes for the set of memory cells are greater than a threshold quality level, selecting a particular read mode for use in performance of the random read operation. The processing device can further perform operations including performing the random read operation using the selected read mode. The selected read mode can be one of the first memory access mode 221 or the second memory access mode 223. In some embodiments, the particular read mode selected from among at least three read modes each having a distinct trim set corresponding thereto and each of the at least three read modes has a different raw bit error rate (RBER) tolerance associated therewith.

Continuing with this example, the processing device is to perform operations including determining than an error involving data requested in performing the random read operation using the selected read mode occurred and, responsive to determining that the error occurred, selecting a different read mode for use in performance of the random read operation. The processing device can further perform operations including performing the random read operation using the different selected read mode. In at least one embodiment, the selected read mode can be the first memory access mode 221 and the different selected read mode can be the second memory access mode 223.

In some embodiments, the processing device is to perform operations including selecting a different read mode for use in performance of the sequential read operation responsive to determining that the signaling indicative of the memory access corresponds to a sequential read operation and/or responsive to determining that the one or more quality attributes for the set of memory cells are greater than a threshold quality level. The processing device can then perform operations including performing the sequential read operation using the selected different read mode. In this example, the different read mode can be the third memory access mode 225.

In some embodiments, the processing device can perform operations including increasing an allowed raw bit error rate (RBER) for the set of memory cells 235-1 to 235-N based, at least in part, on the determined quality attributes for the set of memory cells 235-1 to 235-N being greater than the threshold quality level and/or determining that the signaling indicative of the memory access corresponds to the random read operation. That is, as described above, the processing device can facilitate relaxation of system RBER requirements during performance of at least some memory access operations. This can allow for improved throughput and reduced memory access latency in comparison to approaches that do not allow for relaxation of the system RBER requirements during performance of memory access operations, which can, in turn, improve performance of the memory sub-system 110.

Figure 3:
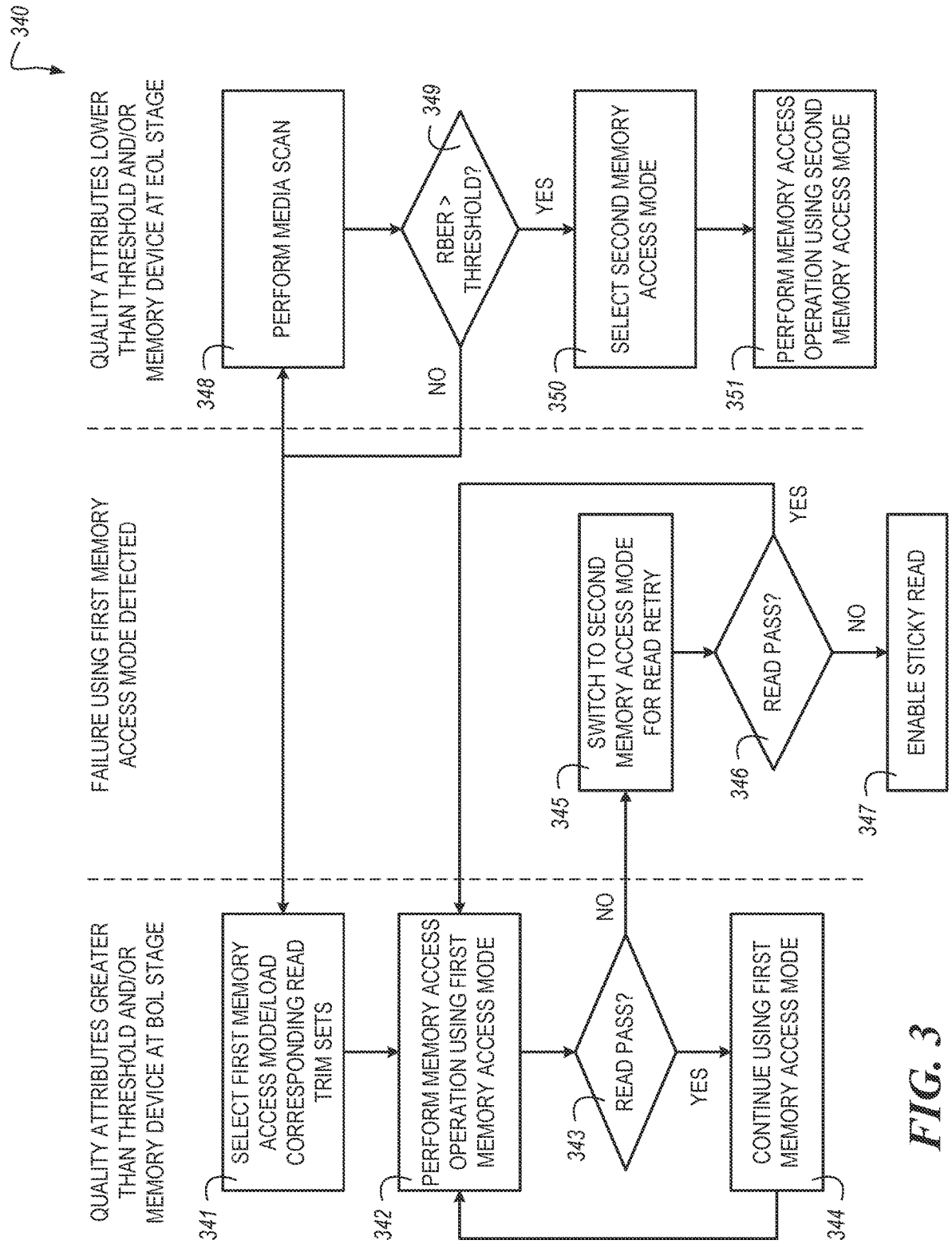
FIG. 3 is a flow diagram corresponding to memory access mode selection in accordance with some embodiments of the present disclosure.

FIG. 3 is a flow diagram 340 corresponding to memory access mode selection in accordance with some embodiments of the present disclosure. The process flow 340 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the process flow 340 is performed by the memory access mode selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The process flow 340 is broken into three sections, which are separated by vertical dashed lines. Each of the three sections corresponds to a different scenario that a memory sub-system (e.g., the memory sub-system 110 illustrated in FIG. 1 and FIG. 2, herein) and/or a memory device (e.g., the memory devices 130/140 illustrated in FIG. 1 and/or the memory device 231 illustrated in FIG. 2, herein) can experience during operation. For example, the left-most section of the process flow 340 corresponds to a scenario in which the quality attributes for memory cells of a memory device are greater than a threshold (e.g., a threshold quality level) and/or the memory sub-system and/or memory device is at a BOL stage of life. The center section of the process flow 340 corresponds to a scenario in which a failure has been detected during performance of a memory access operation using a first memory access mode (e.g., the first memory access mode discussed above in connection with Table 1). Finally, the right-most section of the process flow 340 corresponds to a scenario in which the quality attributes are less than a threshold (e.g., the threshold quality level) and/or the memory sub-system and/or memory device is at an EOL stage of life.

When the quality attributes for memory cells of a memory device are greater than a threshold quality and/or the memory sub-system and/or memory device is at a BOL stage of life, at operation 341, a first memory access mode can be selected for performance of a memory access operation and the trim sets corresponding to the first memory access mode can be loaded, for example, into a cache or other storage locations accessible to a memory access mode selection component (e.g., the memory access mode selection component 113 illustrated in FIG. 1 and FIG. 2, herein). The first memory access mode can be analogous to the first memory access mode 221 described above in connection with FIG. 2.

At operation 342, a memory access operation can be performed using the first memory access mode. In some embodiments, performance of the memory access operation is facilitated by the memory access mode selection component 113 illustrated in FIG. 1 and FIG. 2, herein. At operation 343, a determination can be made as to whether the memory access operation (e.g., a read operation) was successful. That is, a determination can be made as to whether the data retrieved in performance of the memory access operation was successfully decoded. If the memory access operation passes such inspection, at operation 344, the memory sub-system can continue using the first memory access mode and the process flow 340 can return to operation 342.

If, however, the memory access operation does not pass such inspection, at operation 345 the memory access mode selection component can switch to a second memory access mode (e.g., the second memory access mode 223 illustrated in FIG. 2, and the memory access operation can be retried using the second memory access mode. At operation 346, a determination can be made as to whether the memory access operation using the second memory access mode was successful. If the memory access operation using the second memory access mode was successful, the process flow 340 can return to operation 342 and a subsequent memory access operation can be performed using the first memory access mode.

If, however, the memory access operation using the second memory access mode was not successful, at operation 347, a sticky read mode can be enabled for the memory sub-system and/or the memory device. As used herein, a "sticky read" operation generally refers to a read operation that is performed using a particular parameter (e.g., a particular threshold voltage, a particular read offset applied to a default threshold voltage, etc.), when the particular parameter is used for multiple consecutive read operations and the particular parameter is different from a default parameter (e.g., a default read setting, a calibrated read setting, etc.) associated with the memory sub-system. A "sticky read mode" generally refers to a mode of operation of the memory sub-system during which read operations are performed using a particular parameter when the particular parameter is used for multiple consecutive read operations and the particular parameter is different from a default parameter or a calibrated parameter associated with the memory sub-system. Further details regarding a particular parameter, a threshold voltage, a read offset, a default parameter, a default read setting, a calibrated read setting, etc. are described herein.

Turning now to the right-most section of FIG. 3, when the quality attributes are less than a threshold (e.g., the threshold quality level) and/or the memory sub-system and/or memory device is at an EOL stage of life, at operation 348, a media scan involving the memory sub-system and/or memory device can be performed. The media scan can be a background media scan, although embodiments are not so limited. The media scan can read data from portions of the memory device and determine a RBER for the data read during performance of the media scan.

At operation 349, a determination can be made based on the information gathered from performance of the media scan whether the detected RBER is greater than a threshold RBER (e.g., a system RBER requirement) for the memory device. If it is determined that the RBER is not greater than the threshold (e.g., that RBER is less than the threshold), the process flow can return to operation 341 and the first memory mode can be selected. If however, it is determined that the RBER is greater than the threshold, at operation 350 the second memory access mode can be selected (and the corresponding trim sets can be loaded, for example, into a cache or other storage locations accessible to a memory access mode selection component) and, at operation 351, the memory access operation can be performed using the second memory access mode.

Figure 4:
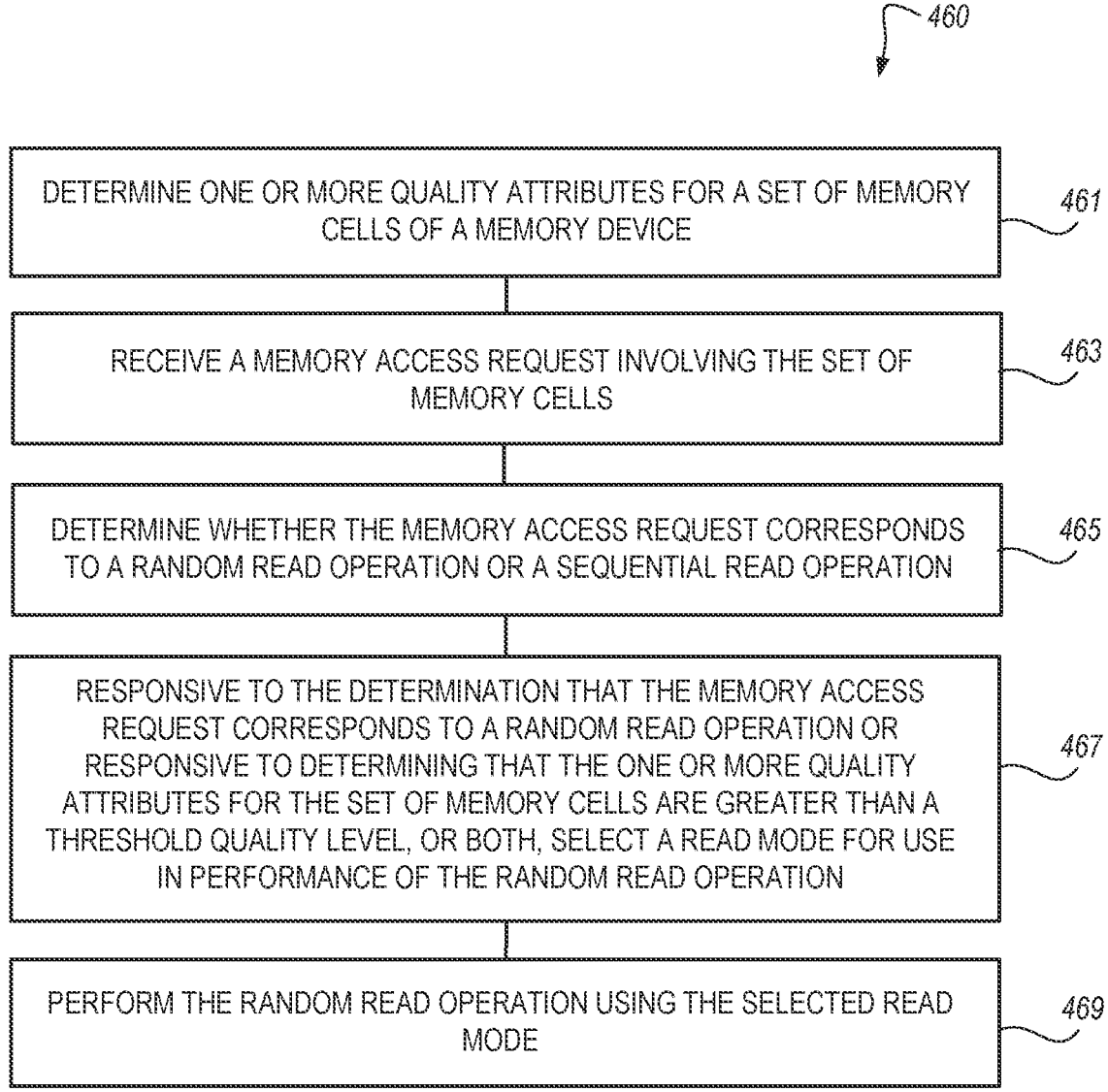
FIG. 4 is a flow diagram corresponding to a method for memory access mode selection in accordance with some embodiments of the present disclosure.

FIG. 4 is flow diagram corresponding to a method 460 for memory access mode selection in accordance with some embodiments of the present disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by the memory access mode selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 461, one or more quality attributes for memory cells of a memory device can be determined. The set of memory cells can be analogous to one or more of the sets of memory cells 235-1 to 235-N illustrated in FIG. 2, herein, while the memory device can be analogous to the memory device 231 illustrated in FIG. 2, herein. As described above, in some embodiments, the determined quality attributes for the memory cells can include a quantity of program-erase cycles for the memory cells.

At operation 463, a memory access request involving data written to at least a portion of the memory cells can be received. In some embodiments, the memory access request can be received by a processing device (e.g., the memory access mode selection component 113 illustrated in FIG. 1, herein) from a host computing device (e.g., the host system 120 illustrated in FIG. 1, herein).

At operation 465, a determination can be made as to whether the memory access request corresponds to a random read operation or a sequential read operation. As described above in connection with Table 1, the random read operation can be performed in around thirty microseconds or less. That is, the random read operation can be performed using the first memory access mode or the second memory access mode described above.

At operation 467, a read mode for use in performance of the random read operation can be selected. The read mode can correspond to one of the memory access modes described above in connection with Table 1. In some embodiments, the read mode is selected responsive to a determination that the memory access request corresponds to a random read operation and/or responsive to a determination that the one or more quality attributes for the memory cells are greater than a threshold quality level.

At operation 469, the random read operation using the selected read mode can be performed. As described above, the random read operation using the selected read mode can be performed by the memory access mode selection component 113 illustrated in FIG. 1, herein, and can further involve transfer of requested data to the host computing device. In some embodiments, the random read operation using the selected read mode can be performed to sense data written to a set of memory cells, which can include fewer memory cells than a page size of the memory device. Embodiments are not so limited, however, and in some embodiments, the random read operation using the selected read mode can be performed to sense data written to multiple sets of memory cells, which can contain a quantity of memory cells equal to or less than the page size of the memory device.

In some embodiments, an operation to increase an allowed raw bit error rate (RBER) for the set of memory cells based, at least in part, on the determined quality attributes for the set of memory cells being greater than the threshold quality level and/or determining that the memory access request corresponds to the random read operation can be performed.

Responsive to determining that the memory access request corresponds to a sequential read operation and/or responsive to determining that the one or more quality attributes for the memory cells are greater than a threshold quality level, a different read mode for use in performance of the sequential read operation can be selected and the sequential read operation can be performed using the selected different read mode.

In some embodiments, a determination than an error involving data requested in performing the random read operation using the selected read mode has occurred. In such scenarios, a different read mode for use in performance of the random read operation can be selected and the random read operation can be performed using the different selected read mode, as discussed in more detail in connection with FIG. 3, herein.

Figure 5:
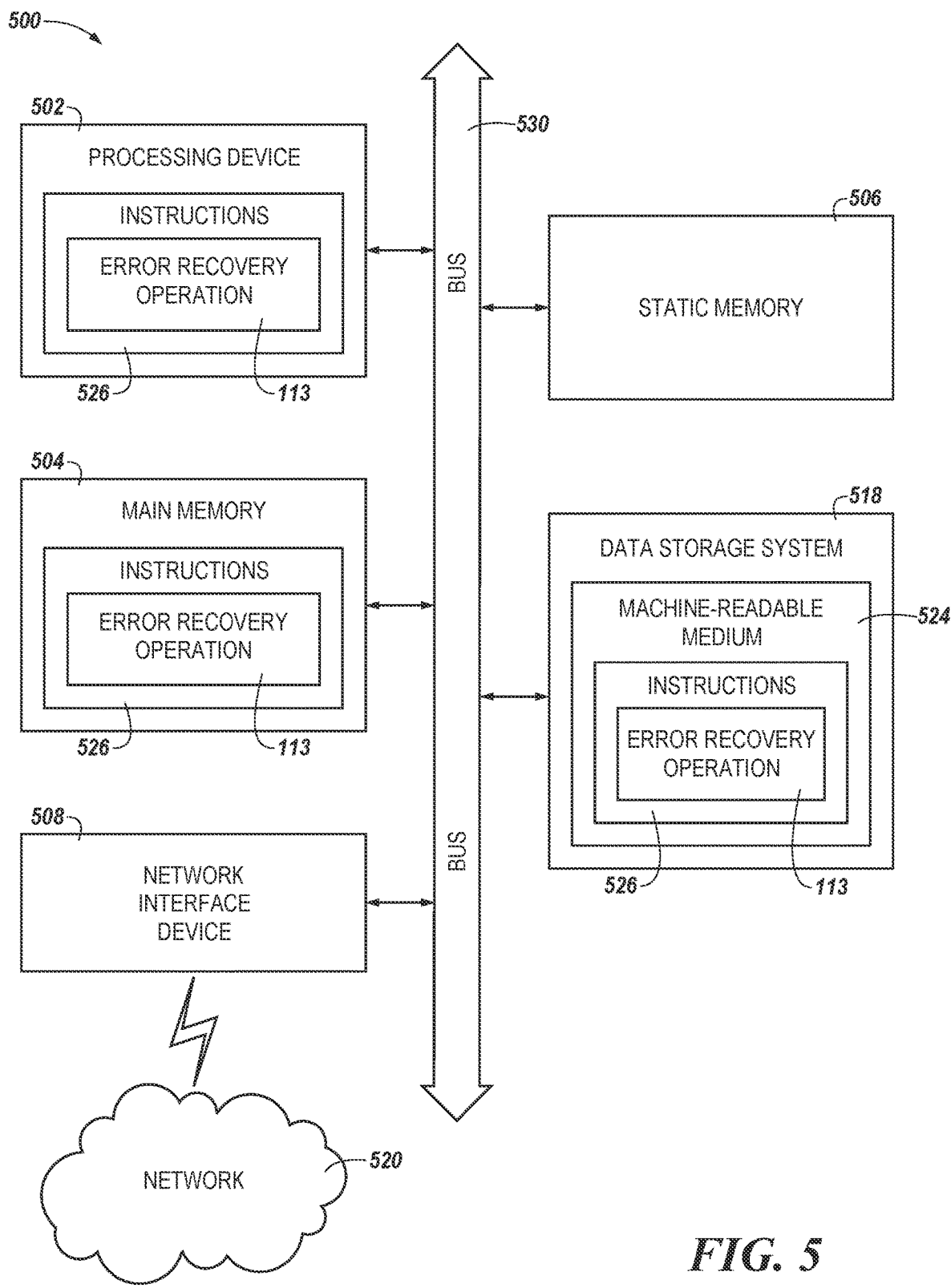
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error recovery operation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a memory access mode selection component (e.g., the memory access mode selection component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   determining one or more quality attributes for memory cells of a memory device;
   receiving a memory access request involving data written to at least a portion of the memory cells;
   determining, based at least in part on the received memory access request, whether performance of a memory access operation specified by the received memory access request corresponds to a random read operation or a sequential read operation;
   determining, based at least in part on the one or more quality attributes for the memory cells being greater than a threshold quality level and whether performance of the memory access operation specified by the received memory access request involves the random read operation or the sequential read operation, a particular memory access command to issue to retrieve data from at least a portion of the memory cells;
   responsive to determining that the received memory access request corresponds to the random read operation or responsive to determining that the one or more quality attributes for memory cells are greater than a threshold quality level, or both, selecting a read mode for use in performance of the random read operation; and
   performing the random read operation using the selected read mode by performing the memory access operation specified by the received memory access request to retrieve the data written to at least the portion of the memory cells.

2. The method of claim 1, further comprising performing the random read operation using the selected read mode to sense data written to at least a set of the memory cells, wherein the set of the memory cells comprises fewer memory cells than a page size of the memory device.

3. The method of claim 1, further comprising increasing an allowed raw bit error rate (RBER) for the set of memory cells based, at least in part, on the determined quality attributes for the set of memory cells being greater than the threshold quality level or determining that the memory access request corresponds to the random read operation, or both.

4. The method of claim 1, wherein determining the one or more quality attributes for the memory cells further comprises determining a quantity of program-erase cycles for the memory cells.

5. The method of claim 1, further comprising:
   responsive to determining that the memory access request corresponds to the sequential read operation or responsive to determining that the one or more quality attributes for the memory cells are greater than a threshold quality level, or both, selecting a different read mode for use in performance of the sequential read operation; and
   performing the sequential read operation using the selected different read mode.

6. The method of claim 1, wherein performing the random read operation further comprises performing the random read operation in around thirty microseconds or less.

7. The method of claim 1, further comprising:
   determining than an error involving data requested in performing the random read operation using the selected read mode occurred;
   responsive to determining that the error occurred, selecting a different read mode for use in performance of the random read operation; and
   performing the random read operation using the different selected read mode.

8. An apparatus, comprising:
   a memory device; and a memory access mode selection component coupled to the memory device, wherein the memory access mode selection component is to:
- determine one or more quality attributes for memory cells of the memory device;
- receive a memory access request involving the memory cells;
- determine, based at least in part on the received memory access request, whether performance of a memory access operation specified by the received memory access request involves a random read operation or a sequential read operation;
- determine, based at least in part on the one or more quality attributes for the memory cells being greater than a threshold quality level and whether performance of the memory access operation specified by the received memory access request involves the random read operation or the sequential read operation, a particular memory access command to issue to retrieve data from at least a portion of the memory cells; and
- perform the memory access operation specified by the received memory access request to retrieve the data from at least the portion of the memory cells.

9. The apparatus of claim 8, wherein:
- when the one or more quality attributes for the memory cells is greater than the threshold quality level and when the memory access operation involves the random read operation, the portion of the memory cells comprises fewer memory cells than a page size of the memory device, and
- the memory access mode selection component is to perform the memory access operation specified by the memory access request to retrieve the data from the portion of the memory cells.

10. The apparatus of claim 9, wherein the memory access mode selection component is to perform the memory access in around thirty microseconds or less.

11. The apparatus of claim 8, wherein:
- when the one or more quality attributes for the memory cells is less than the threshold quality level or when the memory access operation specified by the memory access request involves the sequential read operation, or both, the portion of the memory cells comprises a page size of the memory device, and
- the memory access mode selection component is to perform the memory access operation specified by the memory access request to retrieve the data from the portion of the memory cells.

12. The apparatus of claim 8, wherein the memory access mode selection component is to increase an allowed raw bit error rate (RBER) for the memory cells based, at least in part, on the determined quality attributes for the memory cells being greater than the threshold quality level or determining that the signaling indicative of performance of the memory access operation specified by the memory access request corresponds to the random read operation, or both.

13. The apparatus of claim 8, wherein:
- the particular memory access command is selected from among at least three memory access commands each having a distinct trim set corresponding thereto, and
- each of the at least three memory access commands has a different raw bit error rate (RBER) tolerance associate therewith.

14. The apparatus of claim 8, wherein the one or more quality attributes for the memory cells of the memory device includes a quantity of program-erase cycles associated with the memory cells, a life stage of the memory device, or determined workload characteristics of the memory device, or any combination thereof.

15. A system, comprising:
- a memory device comprising a plurality of NAND memory cells; and
- a processing device coupled to the memory device, the processing device to perform operations comprising:
  - determining one or more quality attributes for a set of memory cells among the plurality of NAND memory cells, wherein the set of memory cells comprises fewer memory cells than a page size of the memory device;
  - receiving signaling indicative of a received memory access request involving the set of memory cells;
  - determining, based at least in part on the received memory access request, whether performance of a memory access operation specified by the received memory access request corresponds to a random read operation or a sequential read operation;
  - determining, based at least in part on the one or more quality attributes for the memory cells being greater than a threshold quality level and whether performance of the memory access operation specified by the received memory access request involves the random read operation or the sequential read operation, a particular memory access command to issue to retrieve data from at least a portion of the memory cells;
  - responsive to determining that the received memory access request corresponds to the random read operation or responsive to determining that the one or more quality attributes for the set of memory cells are greater than a threshold quality level, or both, selecting a particular read mode for use in performance of the random read operation; and
  - performing the random read operation using the particular read mode selected for use in performance of the random read operation by performing the memory access operation specified by the received memory access request to retrieve data written to at least a portion of the set of memory cells.

16. The system of claim 15, wherein the processing device is to perform operations comprising:
- determining than an error involving data requested in performing the random read operation using the particular read mode selected for use in performance of the random read operation has occurred;
- responsive to determining that the error occurred, selecting a different read mode for use in performance of the random read operation; and
- performing the random read operation using the different selected read mode.

17. The system of claim 15, wherein the processing device is to perform operations comprising:
- responsive to determining that the signaling indicative of the memory access corresponds to a sequential read operation or responsive to determining that the one or more quality attributes for the set of memory cells are greater than a threshold quality level, or both, selecting a different read mode for use in performance of the sequential read operation; and
- performing the sequential read operation using the selected different read mode.

18. The system of claim 15, wherein the processing device is to perform operations comprising increasing an allowed raw bit error rate (RBER) for the set of memory cells based, at least in part, on the determined quality attributes for the set of memory cells being greater than the threshold quality level or determining that the signaling indicative of the memory access corresponds to the random read operation, or both.

19. The system of claim 15, wherein:
the particular read mode is selected from among at least three read modes each having a distinct trim set corresponding thereto, and
each of the at least three read modes has a different raw bit error rate (RBER) tolerance associated therewith.

20. The system of claim 15, wherein the memory device and the processing device are resident on a mobile computing device.

* * * * *